US009475635B2

(12) United States Patent
Driskell et al.

(10) Patent No.: US 9,475,635 B2
(45) Date of Patent: Oct. 25, 2016

(54) AEROSOL SPRAYER WITH ANTI-DROOL VALVE

(71) Applicant: MeadWestvaco Corporation, Richmond, VA (US)

(72) Inventors: William L. Driskell, Lee's Summit, MO (US); David Dejong, Ogden, UT (US); Linn D. Wanbaugh, Blue Springs, MO (US)

(73) Assignee: WestRock MWV, LLC, Norcross, GA (US)

( * ) Notice: Subject to any disclaimer, the term of this patent is extended or adjusted under 35 U.S.C. 154(b) by 0 days.

(21) Appl. No.: 14/764,069

(22) PCT Filed: Feb. 4, 2014

(86) PCT No.: PCT/US2014/014531
§ 371 (c)(1),
(2) Date: Jul. 28, 2015

(87) PCT Pub. No.: WO2014/123833
PCT Pub. Date: Aug. 14, 2014

(65) Prior Publication Data
US 2016/0009479 A1 Jan. 14, 2016

Related U.S. Application Data

(60) Provisional application No. 61/760,844, filed on Feb. 5, 2013.

(51) Int. Cl.

| | |
|---|---|
| ***G01F 11/00*** | (2006.01) |
| ***B65D 83/20*** | (2006.01) |
| ***B65D 83/34*** | (2006.01) |
| *B05B 11/00* | (2006.01) |

(52) U.S. Cl.
CPC ........... *B65D 83/206* (2013.01); *B65D 83/345* (2013.01); *B05B 11/3094* (2013.01); *B65D 83/202* (2013.01)

(58) Field of Classification Search
CPC .. B65D 83/206; B65D 83/202; B65D 83/22; B65D 83/201; B65D 83/345; B05B 11/3094; B05B 11/3059
USPC ............. 222/402.13, 402.11, 153.11, 153.13
See application file for complete search history.

(56) References Cited

U.S. PATENT DOCUMENTS

| | | | | | |
|---|---|---|---|---|---|
| 4,166,579 | A * | 9/1979 | Beise | B05B 9/01 | 239/526 |
| 5,624,055 | A * | 4/1997 | Clanet | B65D 83/206 | 222/135 |
| 2007/0023457 | A1* | 2/2007 | O'Toole | B65D 83/206 | 222/402.13 |
| 2009/0272765 | A1* | 11/2009 | Seki | B05B 11/3053 | 222/321.3 |
| 2012/0032004 | A1* | 2/2012 | Dejong | B05B 11/3011 | 239/526 |
| 2012/0234870 | A1* | 9/2012 | Good | B05B 11/0016 | 222/382 |
| 2014/0084026 | A1* | 3/2014 | Gillespie | B65D 83/206 | 222/153.11 |

* cited by examiner

*Primary Examiner* — J. Casimer Jacyna
*Assistant Examiner* — Benjamin R Shaw
(74) *Attorney, Agent, or Firm* — WestRock Intellectual Property Group

(57) ABSTRACT

An actuator with an anti-drool valve is provided for attaching to or mounting on an aerosol container. Aerosol actuators, and more recently trigger actuated aerosol actuators, may include a manifold which fits to or communicates with a valve on an aerosol container or can. Aerosol containers or cans typically contain a propellant such as a compressed gas or a volatile hydrocarbon. The contents of the container, along with the propellant, are held in the container by a container valve.

19 Claims, 14 Drawing Sheets

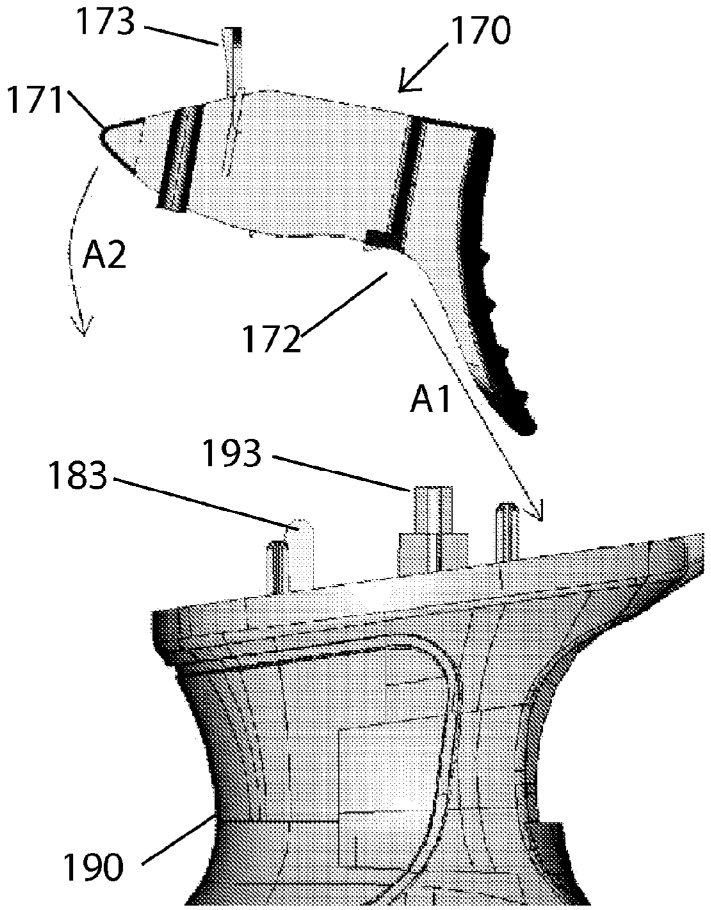
FIG. 4A
FIG. 4B
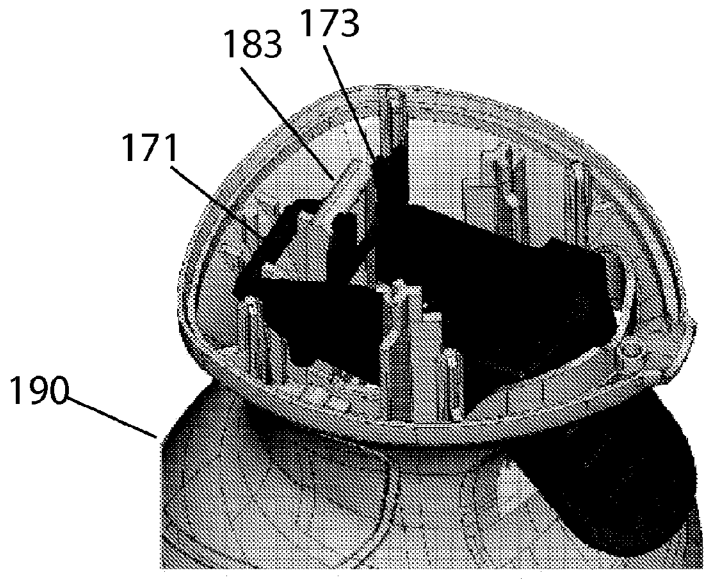

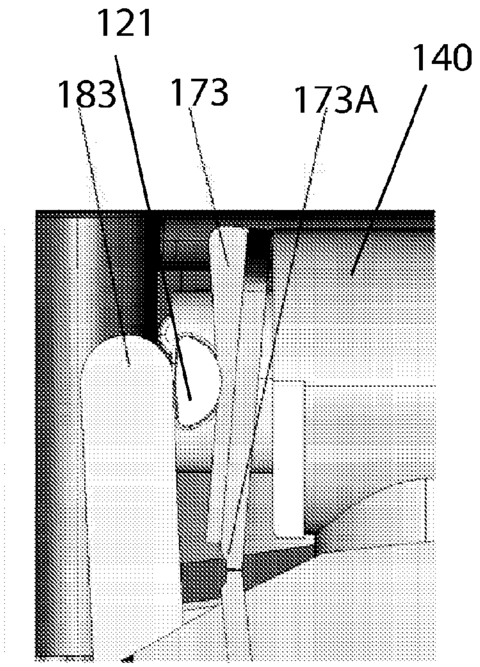
FIG. 10A
FIG. 10B
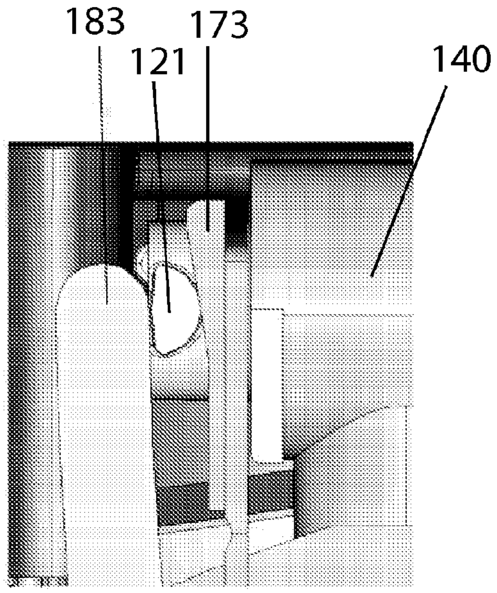
FIG. 10C
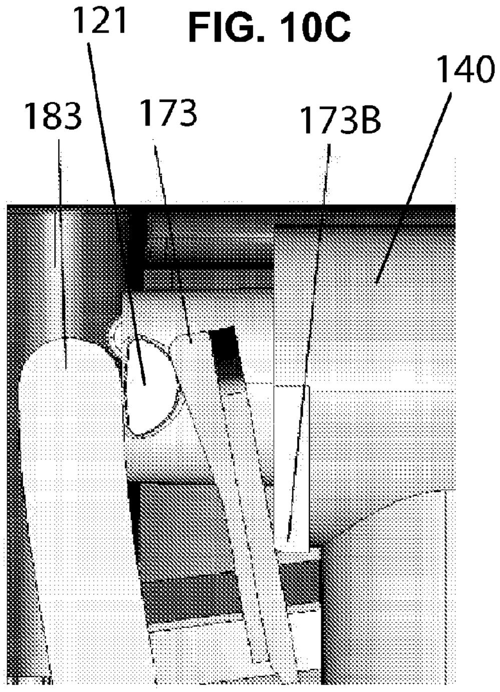

AEROSOL SPRAYER WITH ANTI-DROOL VALVE

BACKGROUND OF THE INVENTION

1. Field of the Invention

Aerosol actuators for mating to an aerosol can and more particularly, aerosol actuators with a valve having anti-drool features.

2. State of the Art

Aerosol actuators, and more recently trigger actuated aerosol actuators, may include a manifold which fits to or communicates with a valve on an aerosol container or can. Aerosol containers or cans typically contain a propellant such as a compressed gas or a volatile hydrocarbon. The contents of the container, along with the propellant, are held in the container by a container valve. The actuator opens an outlet flow channel between the container valve and an outlet device such as a spray nozzle. After dispensing contents from such containers, portions of the dispensed materials are loosely retained in the actuator downstream of the container valve, but upstream of the spray nozzle. These loosely retained contents may seep or 'drool' out of the nozzle, especially if the contents tend to expand, which may be particularly true for hydrocarbon propellants. Thus, an improved actuator that prevents drool is desired.

BRIEF SUMMARY OF THE INVENTION

In one embodiment of the invention, an actuator is disclosed. The actuator includes a manifold; a discharge valve positioned in the manifold and slidably movable between a first position and a second position; and a seal positioned on the discharge valve, wherein the seal closes an outlet in the first position and opens the outlet in the second position. The actuator also includes a first spring element to bias the discharge valve toward the first position; a trigger having an actuated and a non-actuated position; a trigger ramp movable between a first ramp position that permits the discharge valve to slide toward the first position, and a second ramp position that permits the discharge valve to slide toward the second position. The trigger ramp moves to the second ramp position when the trigger is moved to the actuated position.

In another embodiment of the invention, an actuator is disclosed that includes a manifold having a manifold axis; a valve slidably positioned in the manifold for movement along the manifold axis between a first position and a second position; a seal positioned on a first end of the valve that closes an outlet from the manifold when the valve is slid toward the first position; a first spring force to bias the valve toward the first position; a trigger having an actuated and a non-actuated position; a trigger ramp movable between a first ramp position that permits the valve to be slid toward the first position and a second ramp position that permits the valve to be slid toward the second position. The trigger ramp moves to the second ramp position when the trigger is moved to the actuated position, and the trigger moves about a trigger pivot point located between the trigger and the manifold axis.

BRIEF DESCRIPTION OF THE DRAWINGS

While the specification concludes with claims particularly pointing out and distinctly claiming particular embodiments of the present invention, various embodiments of the invention can be more readily understood and appreciated by one of ordinary skill in the art from the following descriptions of various embodiments of the invention when read in conjunction with the accompanying drawings in which:

FIG. 4A illustrates a side view of a trigger and a grip body housing;

FIG. 4B illustrates a top front perspective view of an assembled grip body housing and trigger;

FIG. 10A illustrates a cross section detail of a portion of FIG. 7B showing the interaction of a trigger ramp, forward pushing point, and cross posts in a locked state;

FIG. 10B illustrates a cross section detail of a portion of FIG. 8B showing the trigger ramp, forward pushing point, and cross posts in an unlocked state;

FIG. 10C illustrates a cross section detail of a portion of FIG. 9B showing the trigger ramp, forward pushing point, and cross posts in an actuated state;

DETAILED DESCRIPTION OF THE INVENTION

Figure 1:
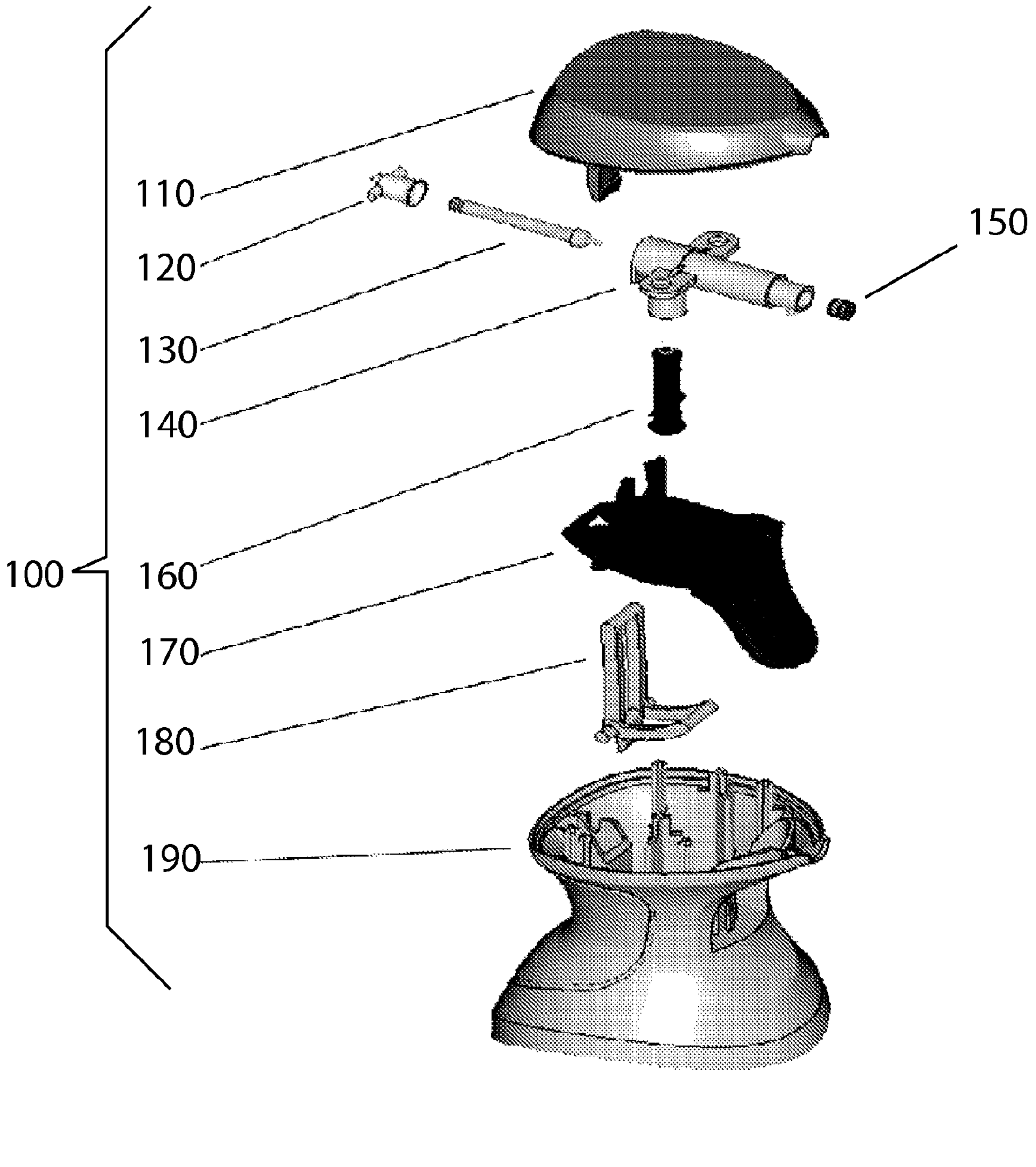
FIG. 1 illustrates an exploded perspective view of parts of an aerosol actuator according to certain embodiments of the invention.

According to various embodiments of the invention, an aerosol actuator may include certain parts shown in FIG. 1 which illustrates an exploded perspective view. The parts of the aerosol actuator 100 may include a cover 110, a discharge valve actuator 120, a discharge valve 130, a manifold 140, an orifice cup 150, a stem actuator 160, a trigger 170, a spring 180, and a grip body housing 190. According to various embodiments of the invention, an actuator 100, or parts thereof, may be made of any selected material. In some embodiments, the parts may be made of plastics such as polypropylene, polyethylene, acetal, and other plastics. For example, in certain embodiments, an aerosol actuator 100 may include a polypropylene (PP) cover 110, a polyethylene (PE) discharge valve actuator 120, a PE discharge valve 130, a PP manifold 140, an acetal orifice cup 150, a PE stem actuator 160, a PP trigger 170, an acetal spring 180, and a PP grip body housing 190.

In the description of the Figures, directional terms such as forward, backward, upper, lower, etc. may be used to indicate relative positions of certain parts. These presence or absence of such terms is not meant to be limiting, but rather to help explain the structure and operation of the aerosol actuator 100. It should be understood that such direction terms are used relative to the orientation of the aerosol actuator as shown in the Figures.

Figure 2:
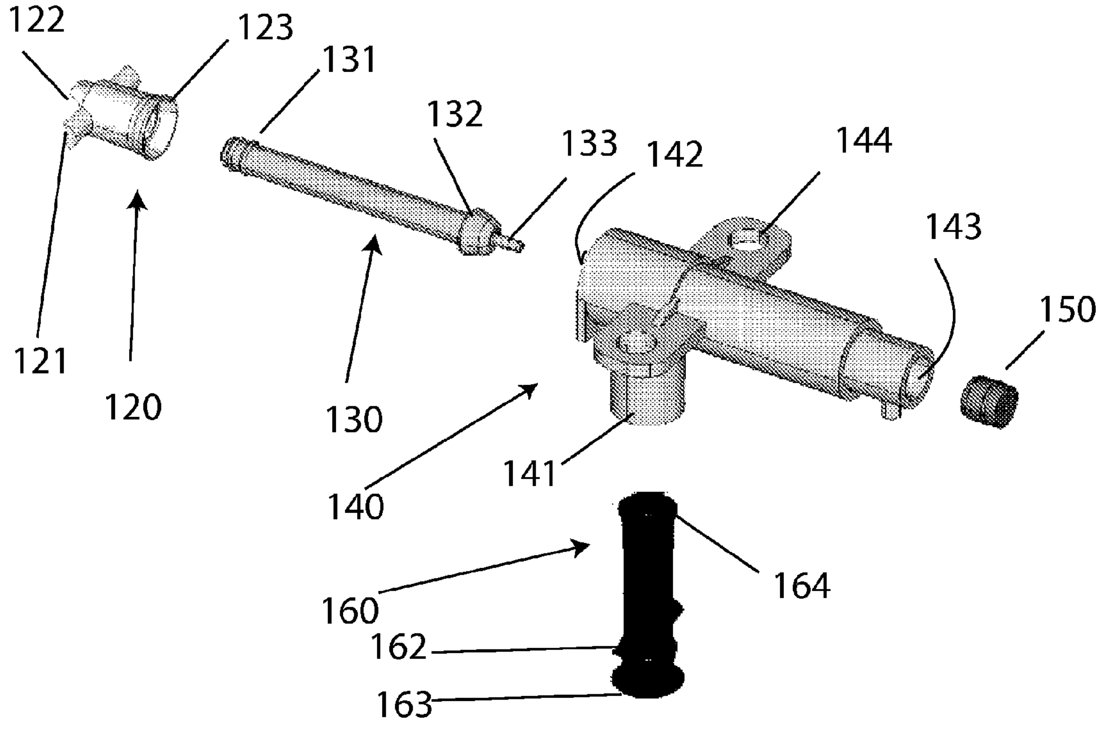
FIG. 2 illustrates an exploded detail view of certain parts of a flow path through an aerosol actuator according to various embodiments of the invention.

FIG. 2 illustrates an exploded detail view of parts which may comprise a flow path through an aerosol actuator 100 according to certain embodiments of the invention. These parts may generally be housed within, assembled with, or connected to, a manifold 140. A manifold may include a manifold inlet 141. A manifold may also include a manifold outlet 143.

A lower part of the flow path may include stem actuator 160 that is received into manifold inlet 141. Stem actuator 160 may have one or more stem posts 162. Stem actuator 160 may have a second or lower end 163 that may fit on a male aerosol container valve 196 (see FIG. 7A). Stem actuator 160 may have a first or upper end opposed the second end. A stem actuator 160 may also have, at the first or upper end, one or more stem chevron seals 164 that fit into manifold inlet 141. A stem chevron seal 164 may seal the first or upper end of the stem actuator 160 to or with the manifold inlet 141.

It should be understood that the parts of aerosol actuator 100 may be single-piece or unitary parts, or the parts may be made of multiple subparts. For example, in some embodiments of the invention, a stem actuator 160 may be a single piece, or may be made of several separate pieces that are assembled or joined together in any suitable manner. The same is true of the other parts used in the aerosol actuator. For example, in other embodiments of the invention, a manifold 140 and stem actuator 160 may be molded as a single part such that a stem chevron seal 164 is not needed on the stem actuator 160 because the stem actuator 160 portion would be an extension of the manifold 140. In some embodiments, a combination manifold 140 and stem actuator 160 could include a bi-injected part such that the manifold 140 and stem actuator 160 are different materials.

A manifold outlet 143 may be provided at the first or front end of manifold 140. A manifold outlet 143 may receive an orifice cup 150. A manifold 140 may house a discharge valve 130 which at its first or front end may have a conical seal 132 and a post 133. Discharge valve 130 may move slidably between a first or forward position and a second or rearward position in manifold 140. A discharge valve 130 at its second or back end may have one or more interlocking features 131 that may fit into or onto discharge valve actuator 120. A first or front end of discharge valve actuator 120 may contact the second or back end of the discharge valve 130. A discharge valve actuator may have a manifold chevron seal 123 fitting into an opening 142 on the second or back end of the manifold 140. This manifold chevron seal 123 may prevent leakage from the second or back end of manifold 140. A discharge valve actuator 120 may have cross posts 121. A discharge valve may have a back surface 122 that bears on a spring 180 as described below. Manifold 140 may have one or more manifold mounting holes 144 to secure the manifold 140 to the grip body housing 190.

Figure 3:
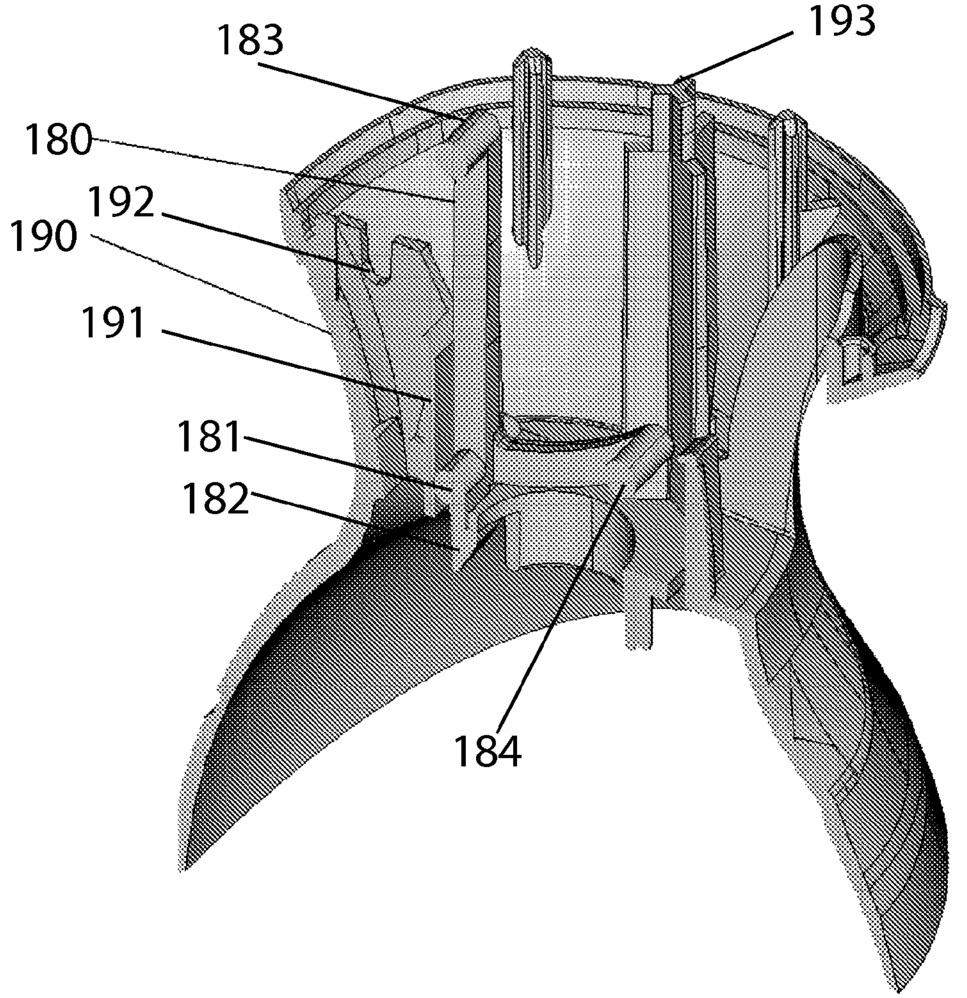
FIG. 3 illustrates a side cross section view of a grip body housing and actuator spring.

FIG. 3 illustrates a side cross section view of grip body housing 190 with spring 180 inserted therein according to certain embodiments of the invention. A spring 180 may be made of a relatively stiff and somewhat resilient material such as acetal. In some embodiments, the spring 180 may have a generally L-shaped aspect. The lower corner of the spring 180 may be considered a relatively fixed point, although a limited rocking motion may occur here. The spring may include one or more trunnions 181. The trunnions 181 may be located at or near a corner of the L-shape along with one or more spring tangs 182. The spring tangs 182 may snap or lock the spring 180 into the grip body housing 190. The vertical leg of spring 180 may terminate at forward-pushing point 183. The lower portion of the spring may rest upon or against back wall 191. The spring 180 horizontal leg may terminate at upward-pushing point 184.

Although spring 180 is shown as L-shaped, a spring may have other shapes. A spring 180 according to embodiments of the invention may also have more than one part, for example a spring 180 may include a first spring element to provide the forward-pushing point 183, and a second spring element to provide the upward-pushing point 184.

As illustrated in FIG. 3, a grip body housing 190 according to certain embodiments of the invention may also include one or more trigger pivot supports 192 and one or more manifold support posts 193.

FIG. 4A illustrates a side view of a possible assembly step of placing trigger 170 into grip body housing 190. The forward-pushing point 183 of the spring 180 is shown within the grip body housing, as is a manifold support post 193, one or more of which may extend from the grip body housing 190. Trigger 170 may be assembled with grip body housing 190 by lowering the trigger forward as denoted by arrow A1, and then rocking it backward as denoted by arrow A2, so that the trigger pivot trunnion 171 may be received by trigger pivot support 192 (shown in FIG. 3). Also shown on trigger 170 is trigger ramp 173.

FIG. 4B illustrates a top front perspective view of the grip body housing 190 with trigger 170 installed.

Figure 5A:
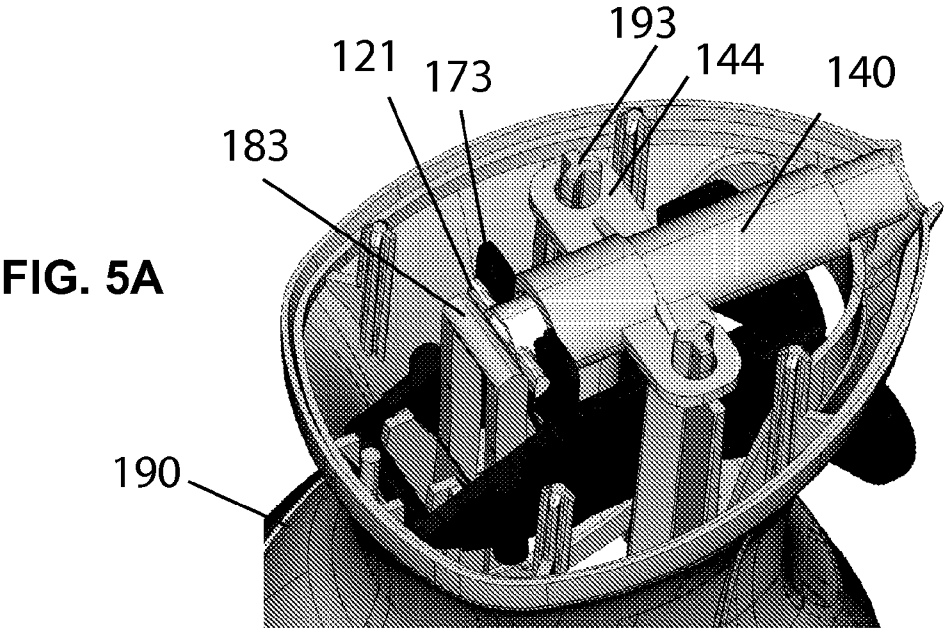
FIG. 5A illustrates a top back perspective view of a grip body housing assembled with a manifold.
Figure 5B:
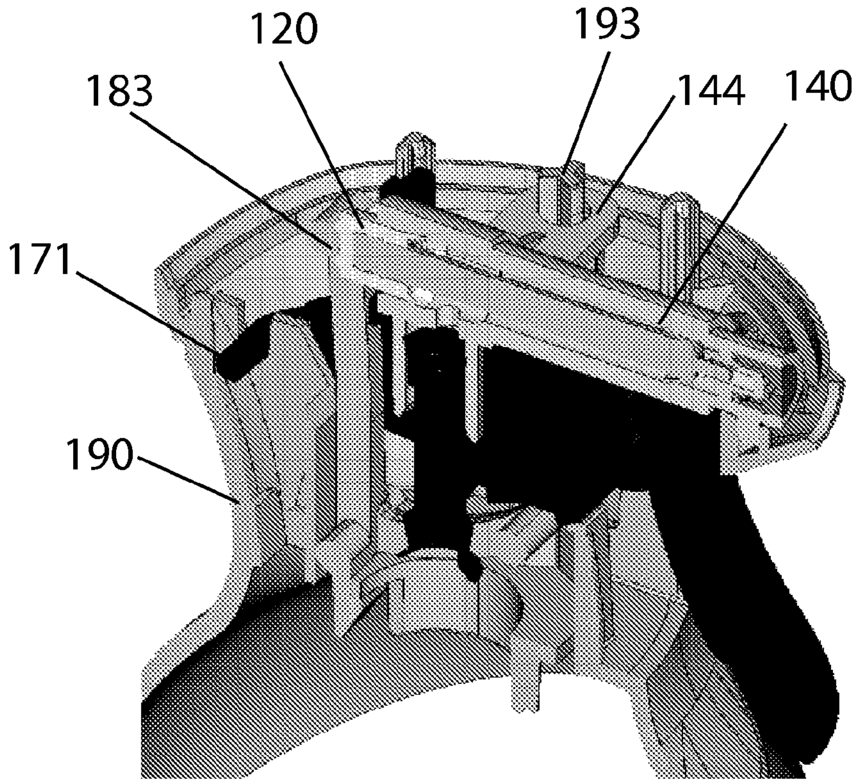
FIG. 5B illustrates a side cross section view of the grip body housing assembled with a manifold illustrated in FIG. 5A.

FIG. 5A illustrates a top back perspective view of the grip body housing 190 with the manifold 140 assembled with the grip body housing 190. One or more manifold mounting holes 144 may be exist on manifold 140 and may receive manifold support posts 193. Extending from the second or back end of the manifold 140 may be discharge valve actuator 120. Forward-pushing point 183 may push against the second or back end of discharge valve actuator 120. Trigger ramp 173 may straddle the discharge valve actuator 120 just forward of cross posts 121 and just behind the second or back end of manifold 140. FIG. 5B illustrates a side cross section view of the same parts.

Figure 6A:
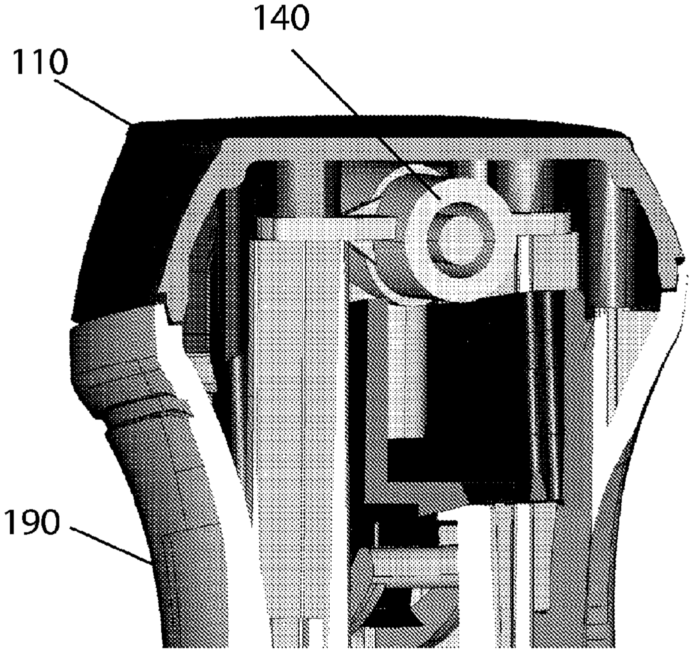
FIG. 6A illustrates a front cutaway view of a grip body housing with a cover attached.
Figure 6B:
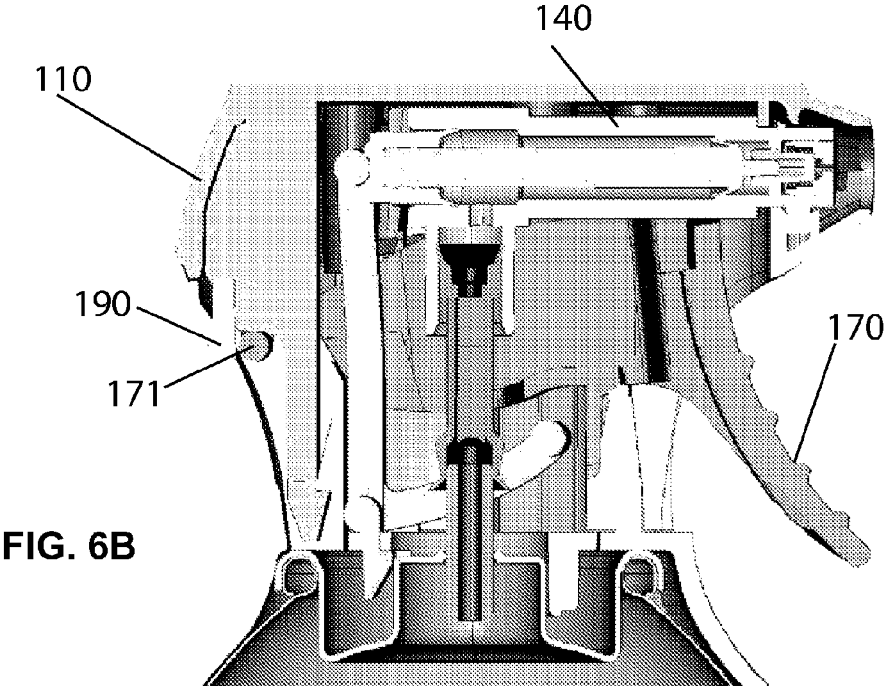
FIG. 6B illustrates a side cross section view of an actuator according to various embodiments of the invention.

FIG. 6A illustrates a front cutaway view of the grip body housing 190 with cover 110 attached, and showing the manifold 140 within. FIG. 6B illustrates a side cross section view of the same.

FIGS. 7A through 9B illustrate an actuator 100 in locked, unlocked, and actuated states according to various embodiments of the invention.

Figure 7A:
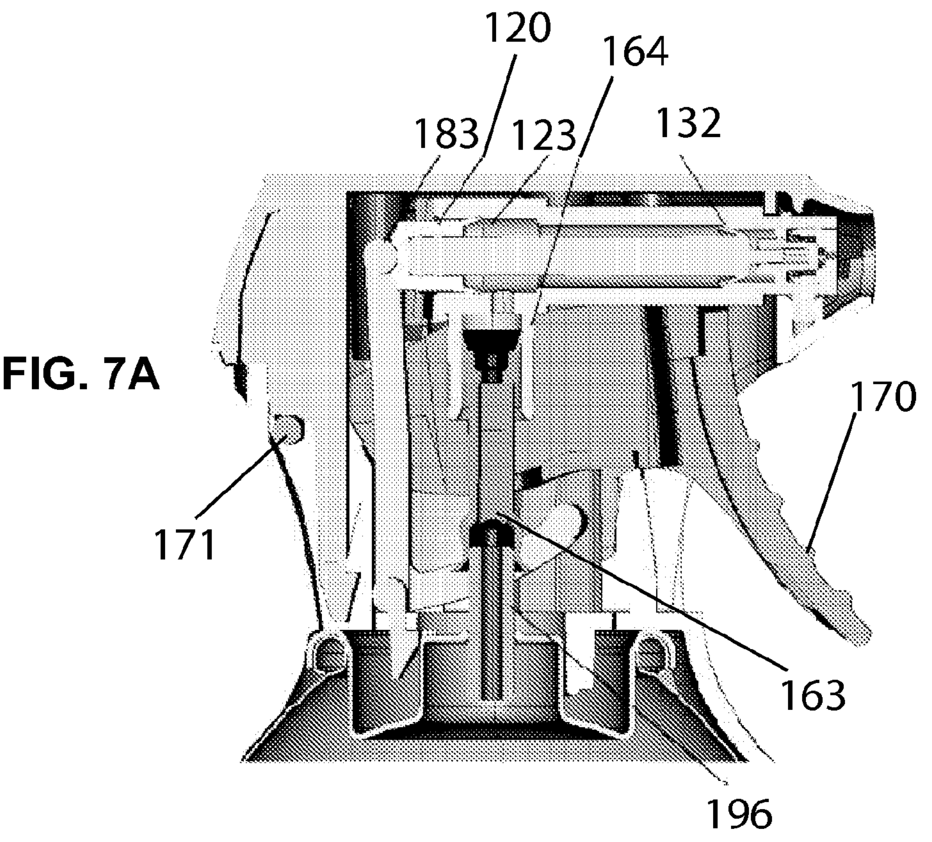
FIG. 7A illustrates a side cross section view of an actuator in a locked state.
Figure 7B:
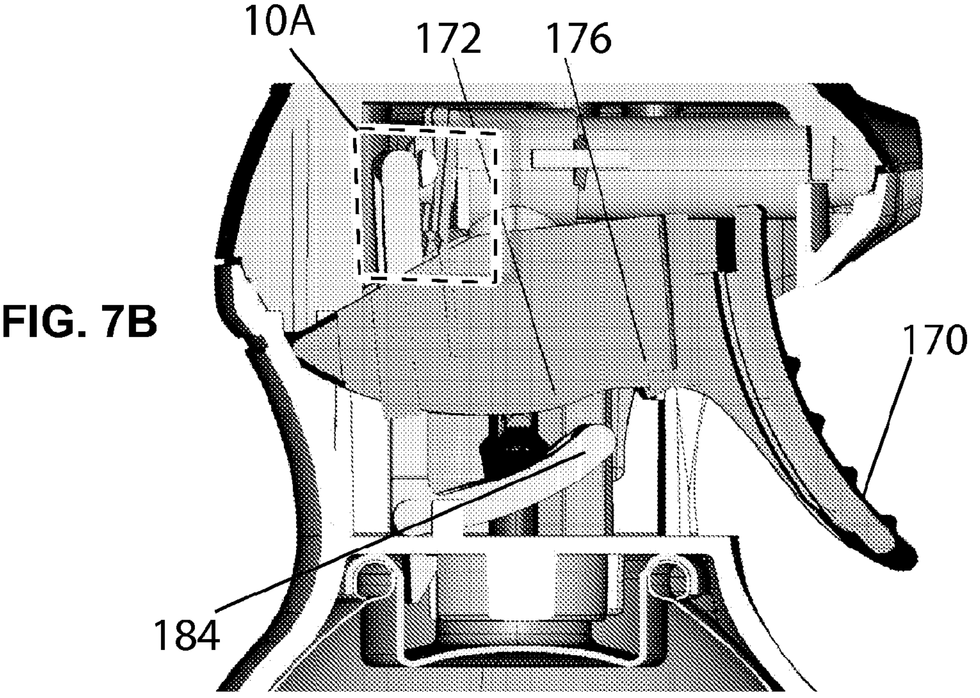
FIG. 7B illustrates a partial side cutaway view of an actuator in a locked state.

FIG. 7A illustrates a side cross section view of the actuator in a locked state. FIG. 7B illustrates a partial side cutaway view. Forward-pushing point 183 of the spring 180 may bear forward on the back of discharge valve actuator 120. Conical seal 132 may seal the front of the manifold 140 and may prevent drooling from the actuator. Manifold chevron seal 123 may seal the back of the manifold 140.

Stem chevron seal 164 may seal the first or upper end of the stem actuator 160 into the manifold inlet 141. The second or lower end 163 of stem actuator 160 may receive the upper end of male aerosol container valve 196. It will be noted that in the locked state, trigger 170 may rest fairly high up in the actuator. In particular, trigger engagement point 172 may be clear of the spring upward-pushing point 184, and the trigger ramp 173 may be located relatively high with respect to the discharge valve actuator 120. A detail of highlight areas 10A is explained later with reference to FIG. 10A.

Figure 8A:
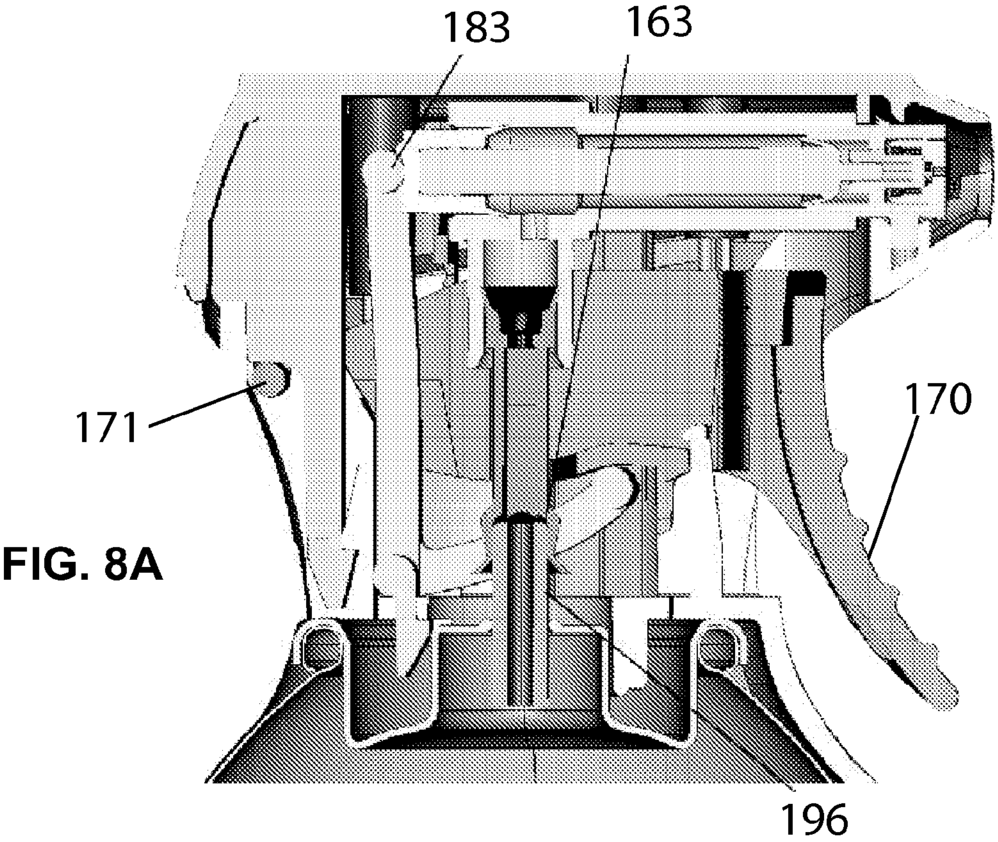
FIG. 8A illustrates a side cross section view of an actuator in an unlocked state.
Figure 8B:
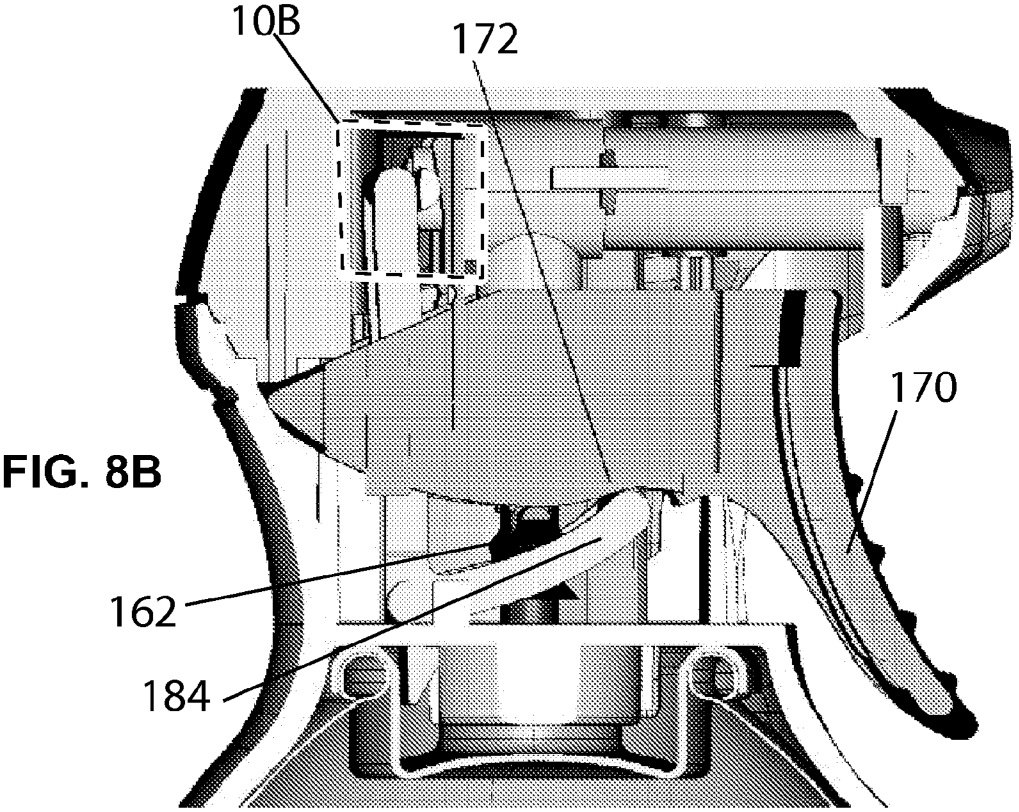
FIG. 8B illustrates a partial side cutaway view of an actuator in an unlocked state.

FIG. 8A illustrates a side cross section view of the actuator in an unlocked state with the trigger 170 pivoted slightly downward. The unlocked state may also be considered a non-actuated position. FIG. 8B illustrates a partial side cutaway view. Forward-pushing point 183 of the spring 180 may bear forward on the back of discharge valve actuator 120. Conical seal 132 may seal the front of the manifold to prevent drooling from the actuator. Due to force exerted by the lowered trigger 170 onto stem posts 162, the second or lower end 163 of stem actuator 160 may move toward aerosol container valve 196 (e.g., downward as viewed in the Figure) toward the upper end of male aerosol container valve 196, so that the aerosol container valve 196 may be opened if the trigger is pulled farther. It will be noted that in the unlocked state or non-actuated position, trigger 170 may rest a little lower in the actuator. In particular trigger engagement point 172 may be close to or may touch the upward-pushing point 184 of spring 180.

Figure 9A:
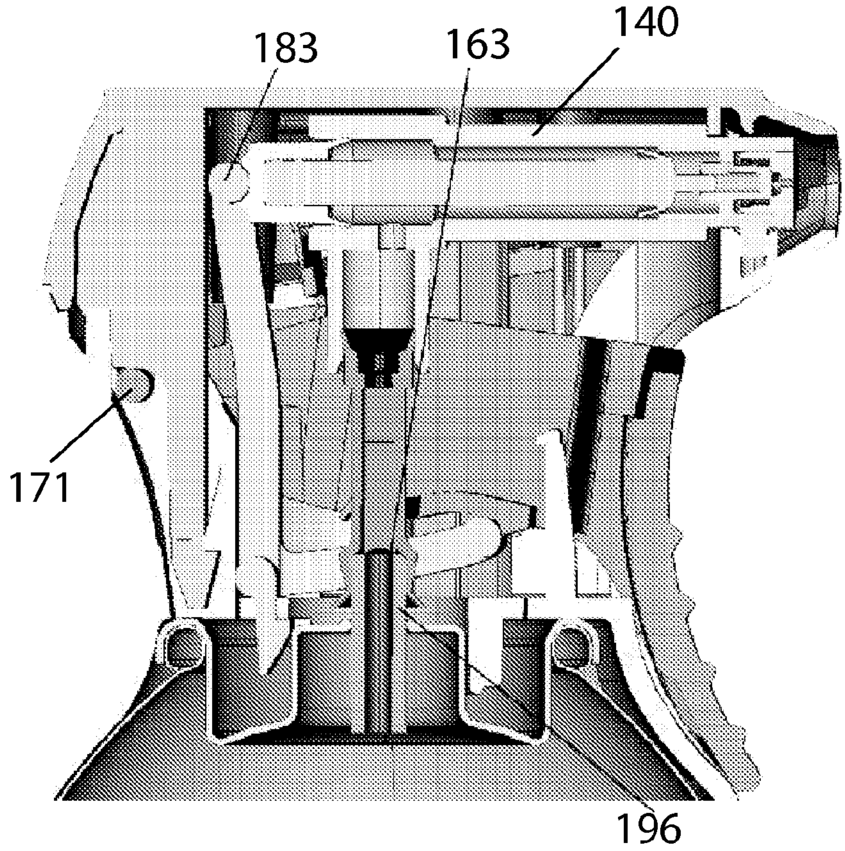
FIG. 9A illustrates a side cross section view of an actuator in an actuated state.
Figure 9B:
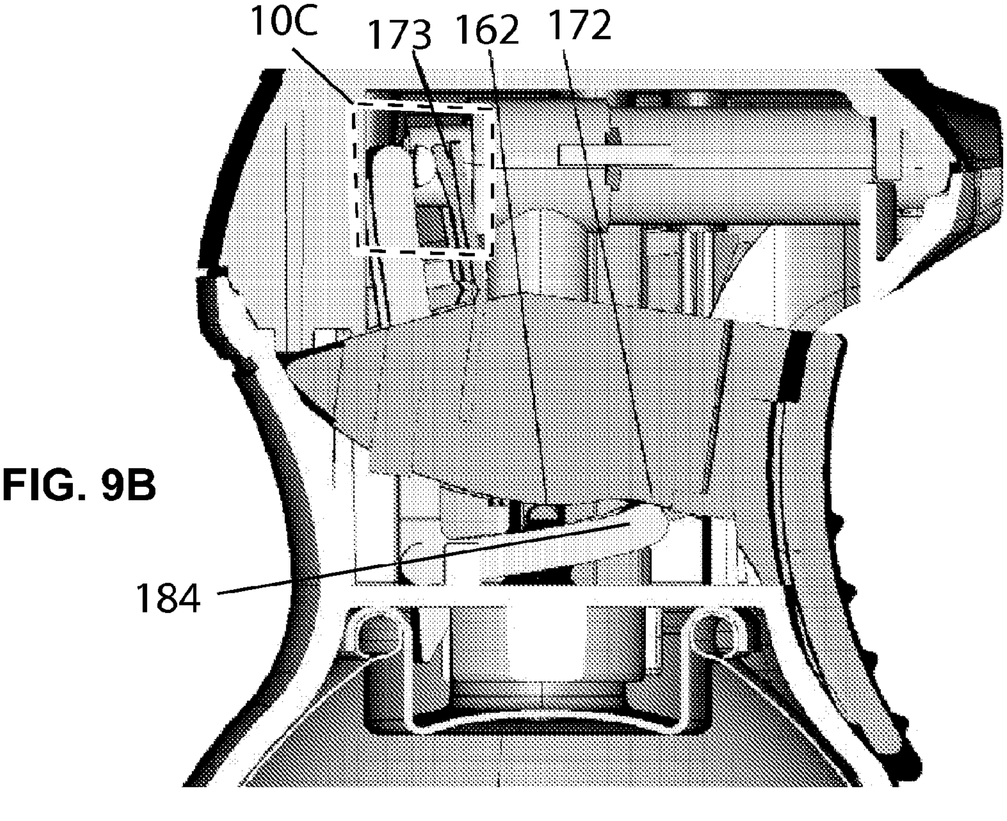
FIG. 9B illustrates a partial side cutaway view of an actuator in an actuated state.

FIG. 9A illustrates a side cross section view of the actuator in an actuated state with the trigger 170 pivoted farther downward. FIG. 9B illustrates a partial side cutaway view. Forward-pushing point 183 of the spring 180 may still bear forward on the back of discharge valve actuator 120. The downward movement of the trigger ramp 173 may act as a lever or wedge and may force back the discharge valve actuator 120. Forces upon the valve actuator 120, such as forces provided by the trigger ramp 173 or forward-pushing point 183, may in turn be transmitted via the discharge valve actuator 120 and to discharge valve 130. Thus, the trigger ramp 173 may pull upon or allow the discharge valve 130 to move toward the second or rear position, causing conical seal 132 to move back and unseal from the front of manifold 140 to allow liquid to flow through the manifold. Due to further force exerted by lowered trigger 170 onto stem posts 162, the second or lower end 163 of stem actuator 160 may move sufficiently farther (e.g. downward as viewed in FIG. 9B) onto the upper end of male aerosol container valve 196 to open that valve. It will be noted that in the actuated state, trigger engagement point 172 having moved downward may have flexed the lower arm of spring 180, which resists by providing force on the spring upward-pushing point 184, resisting the trigger and attempting to force it back to the unlocked position.

FIG. 10A illustrates a detail showing the trigger ramp 173 in a locked state where it may occupy a first or closed ramp position. The trigger ramp 173 may act as a sort of wedge, located in the space between cross posts 121 of the discharge valve actuator 120, and the back of the manifold 140. The trigger ramp 173 may be tilted slightly forward relative to ramp flexing point 173A where it connects to the trigger proper. The forward-pushing point 183 may bear against back surface 122 of the discharge valve actuator 120, which may maintain the discharge valve actuator 120 and the discharge valve 130 in a closed (forward) state.

FIG. 10B illustrates a detail showing the trigger ramp 173 in an unlocked state where it may still occupy a first or closed ramp position. As the trigger 170 moves yet further, the trigger ramp 173 may move downward with the trigger 170, so that the trigger ramp 173 may now generally fill the space between cross posts 121 of the discharge valve actuator 120, and the back of the manifold 140 so that any farther movement will start to open the discharge valve 130. The trigger ramp 173 may be aligned generally vertically relative to ramp flexing point 173A where it connects to the trigger 170 proper.

FIG. 10C illustrates a detail showing the trigger ramp 173 in a second or actuated state or position. As the trigger itself rotates downwards, its upper parts may move forward, including ramp flexing point 173A. The ramp may be pulled downward and forward, and may encounter fulcrum point 173B that may be located on the back of the manifold, or on another structure such as the grip body housing 190. As the lower part of the trigger ramp 173 moves forward, the upper half may tilt backward, which may force back the cross posts 121 of the discharge valve actuator 120. The forward-pushing point 183 may provide resistance against this backward movement, but discharge valve actuator 120 and the attached discharge valve 130 may nonetheless move backward, opening the conical seal 132 and allowing fluid to flow from the manifold 140, through orifice cup 150, and out the nozzle.

Note that trigger pivot trunnion 171 may be located below the axis of manifold 140 as illustrated in FIG. 9A. When trigger 170 is actuated or pulled back, it may rotate "clockwise" or generally downward and backward. Any structure rigidly attached to the trigger and extending up to the axis of manifold 140 would be expected to move forward relative to the manifold. The use of the trigger ramp 173 with fulcrum point 173B causes the same trigger motion instead to provide a backward motion relative to manifold 140, which may be used to advantageous effect here to open the discharge valve 130 by pulling back on the discharge valve actuator 120.

Once trigger 170 is released, spring upward-pushing point 184 bearing on trigger engagement point 172 may return trigger 170 to the unlocked position. Consequently trigger ramp 173 may rise upward, removing the backward force against cross posts 121 and allowing forward-pushing point 183 to push forward on back surface 122 of discharge valve actuator 120, in turn pushing forward on discharge valve 130 and closing the conical seal 132 to prevent drool. At the same time the trigger rising upward may remove the downward force on stem posts 162, allowing the stem actuator 160 to move upward as urged by the upward force from aerosol container valve 196.

Figure 11:
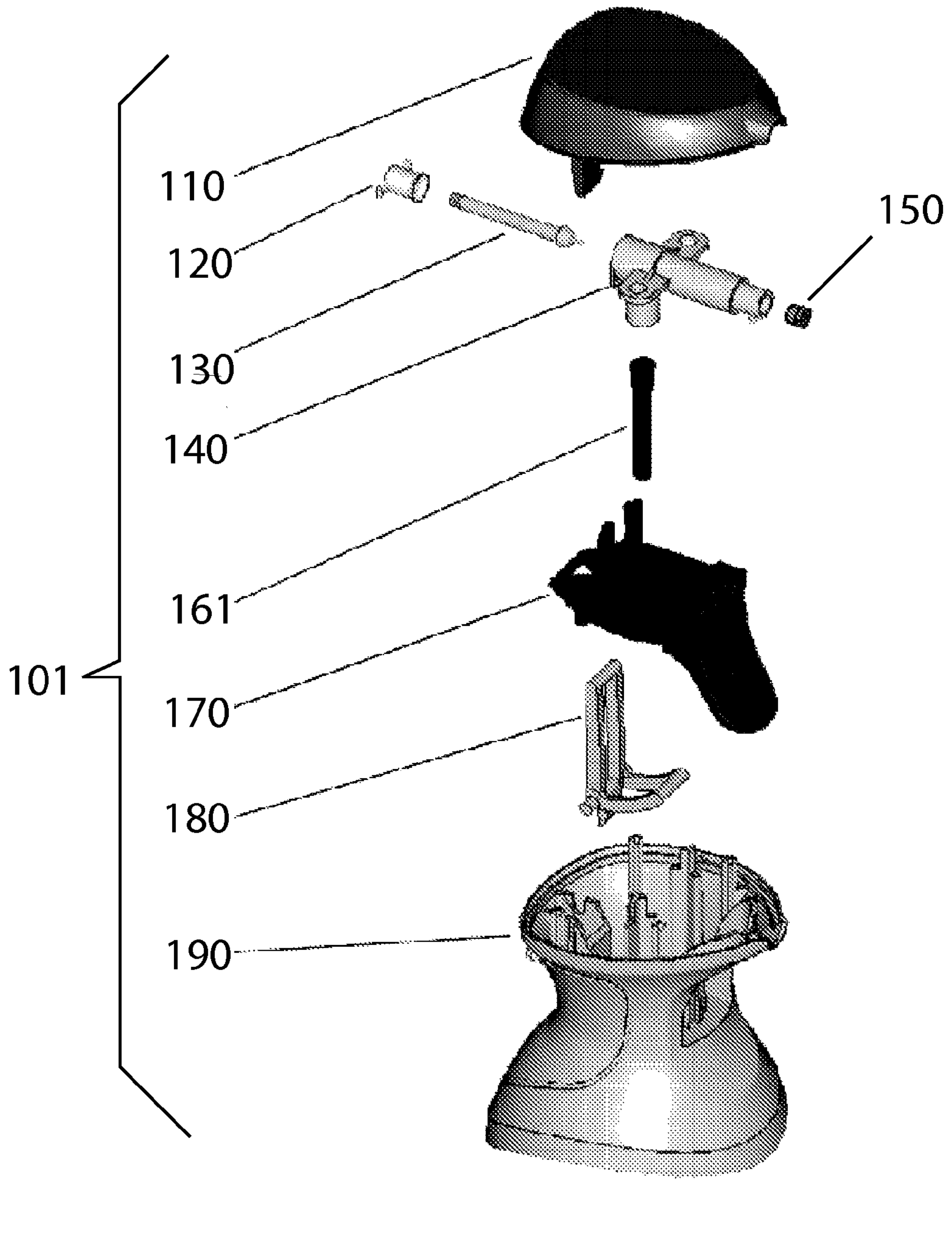
FIG. 11 illustrates an exploded perspective view of parts of an aerosol actuator according to certain embodiments of the invention.
Figure 12:
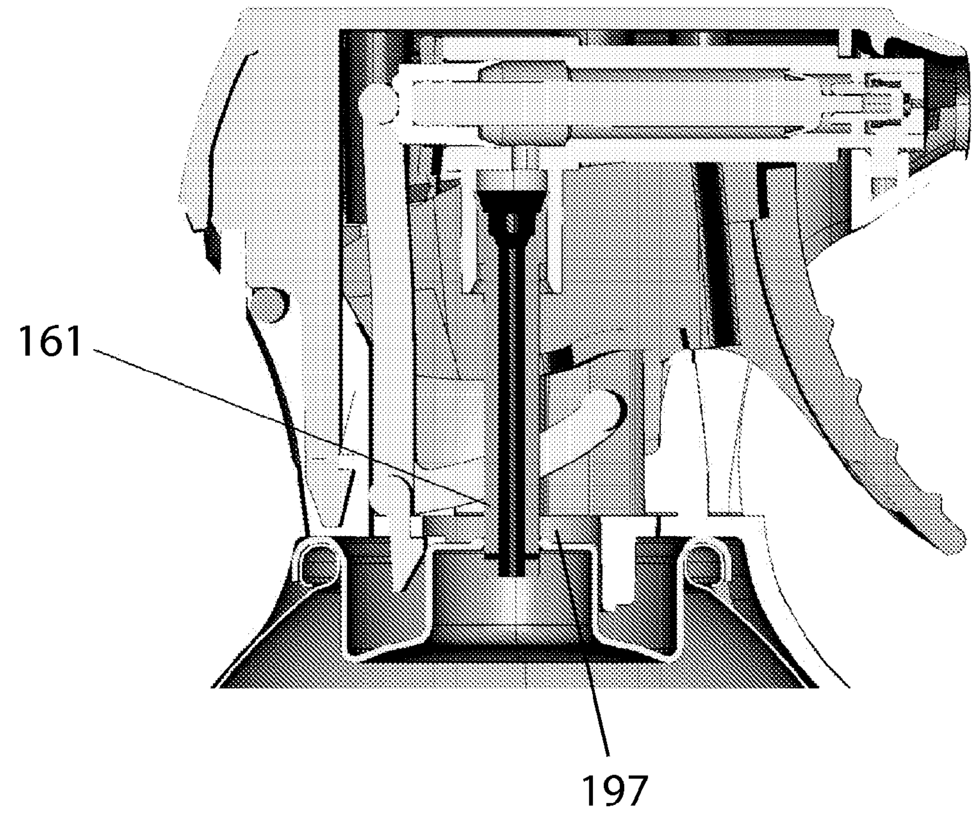
FIG. 12 illustrates a side cross section of an aerosol actuator according to certain embodiments of the invention.

FIG. 11 illustrates an exploded perspective view of parts of an aerosol actuator according to another embodiment of the invention. This embodiment is similar to that shown in FIG. 1, except that the stem actuator 161 may be adapted to fit a female aerosol valve 197. In particular as can be seen in the side cross section of FIG. 11, the stem actuator 161 may be cylindrical at its bottom and may fit directly into female aerosol valve 197.

Figure 13:
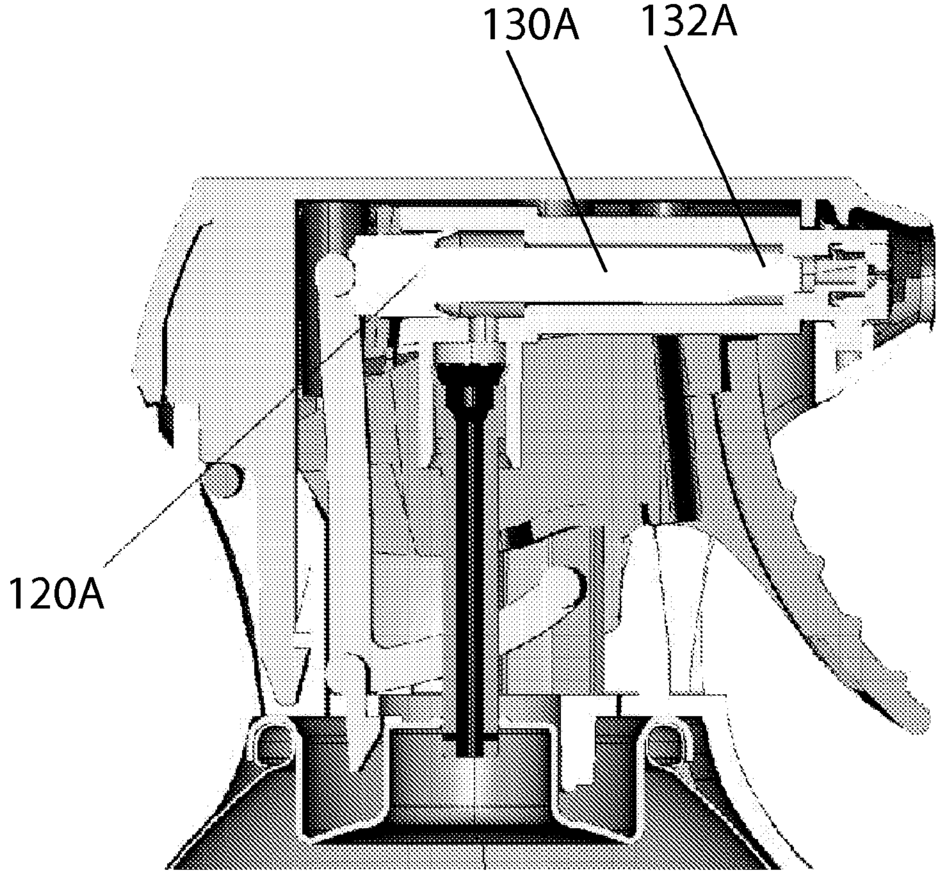
FIG. 13 illustrates an aerosol actuator according to various embodiments of the invention with a single-piece control valve.

FIG. 13 illustrates an embodiment with a single-piece control valve made up essentially of a valve portion 130A and a valve actuator portion 120A. The forward seal 132A may be a form different from or the same as conical seal 132 seen in the previous Figures.

Figure 14:
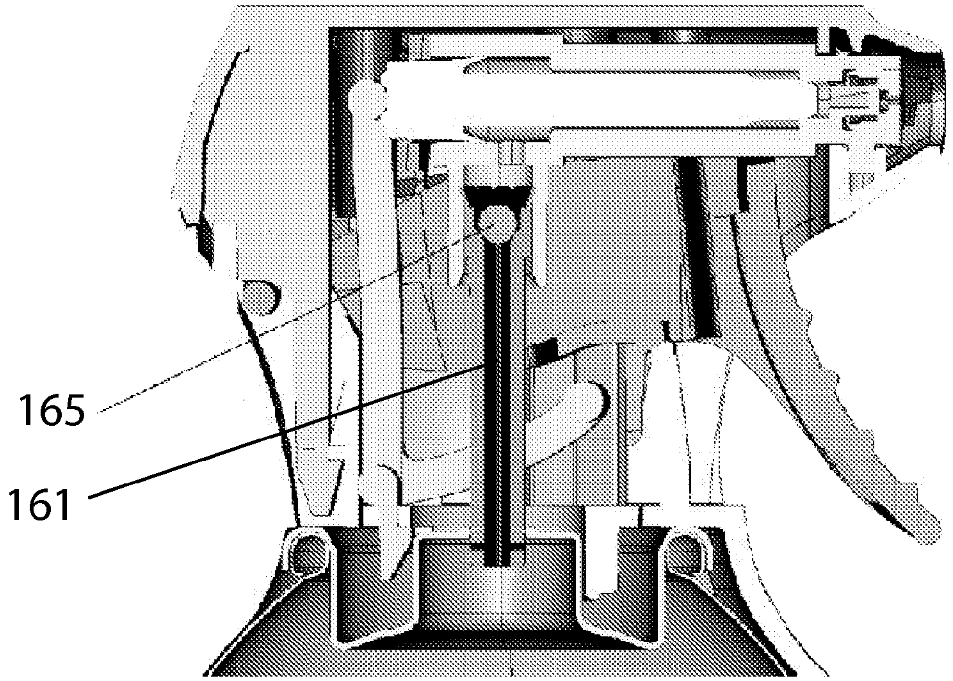
FIG. 14 illustrates an aerosol actuator according to various embodiments of the invention with a ball check valve.

FIG. 14 illustrates an embodiment with a ball check valve 165 that may be located in the flow path, for example at the first or upper end of stem actuator 161 (or 160).

Having thus described certain particular embodiments of the invention, it is understood that the invention defined by the appended claims is not to be limited by particular details set forth in the above description, as many apparent variations thereof are contemplated. Rather, the invention is limited only be the appended claims, which include within their scope all equivalent devices or methods which operate according to the principles of the invention as described.

What is claimed is:

1. An actuator, comprising:

a manifold comprising a manifold inlet, a manifold outlet, and an opening opposite the manifold outlet;

a discharge valve positioned in the manifold and slidably movable between a first position and a second position;

a discharge valve actuator positioned in the opening and in contact with the discharge valve;

a seal positioned on the discharge valve, wherein the seal closes the manifold outlet in the first position and opens the manifold outlet in the second position;

a first spring element in contact with the discharge valve actuator to bias the discharge valve toward the first position;

a trigger having an actuated and a non-actuated position; and a trigger ramp movable between a first ramp position when the trigger is in a non-actuated position and the discharge valve is in the first position and a second ramp position when the trigger is in an actuated position, wherein the trigger ramp acts on the discharge valve actuator to slide the discharge valve toward the second position.

2. The actuator of claim 1, wherein the trigger ramp is hingedly attached to the trigger.

3. The actuator of claim 1, wherein the trigger is biased toward the non-actuated position by a second spring element.

4. The actuator of claim 1, wherein the first spring element is provided by a flexing spring.

5. The actuator of claim 3, wherein the second spring element is provided by a flexing spring.

6. The actuator of claim 3, where the first and second spring elements are both provided by an L-shaped spring.

7. The actuator of claim 1, further comprising a stem connection for connecting to an aerosol container.

8. The actuator of claim 7, wherein movement of the trigger to the actuated position causes the stem connection to move toward the aerosol container.

9. The actuator of claim 7, wherein the stem is adapted for connection to a male aerosol valve.

10. The actuator of claim 7, wherein the stem is adapted for connection to a female aerosol valve.

11. The actuator of claim 1, further comprising an inlet in the manifold and a ball check valve located in the inlet.

12. The actuator of claim 7, further comprising a ball check valve located in the stem connection.

13. The actuator of claim 7, wherein moving the trigger to the actuated position moves the stem connection toward the aerosol container and the discharge valve toward the second position.

14. An actuator, comprising:

a manifold having a manifold axis and an opening along the axis;

a valve slidably positioned in the manifold for movement along the manifold axis between a first position and a second position;

a discharge valve actuator positioned in the opening adjacent the valve and in contact therewith, a portion of the discharge valve actuator extending outside of the manifold;

a seal positioned on a first end of the valve that closes a manifold outlet when the valve is in the first position;

a first spring force acting on the discharge valve actuator to bias the valve toward the first position;

a trigger having an actuated and a non-actuated position; a trigger ramp movable between a first ramp position that permits the valve to be slid toward the first position and a second ramp position that permits the valve to be slid toward the second position;

wherein the trigger ramp moves to the second ramp position when the trigger is moved to the actuated position; and wherein the trigger moves about a trigger pivot point located between the trigger and the manifold axis.

15. The actuator of claim 14, wherein the outlet is opened with the valve is slid toward the second position.

16. The actuator of claim 14, wherein the trigger ramp bears upon the discharge valve actuator.

17. An actuator, comprising:

a grip body housing configured to attach to an aerosol container, the grip body housing comprising at least one trigger pivot support and at least one manifold support post;

a trigger mounted on the at least one trigger pivot support within an interior of the grip body, the trigger comprising a trigger ramp;

a manifold mounted on the at least one manifold support post with the interior of the grip body, wherein the manifold comprises:

a manifold axis;

an opening on the manifold axis;

a manifold inlet; and a manifold outlet on the manifold axis opposite the opening;

a discharge valve positioned in an interior of the manifold between the opening and the manifold outlet;

a discharge valve actuator comprising a manifold chevron seal and at least one cross post, wherein at least the manifold chevron seal is seated in the opening and the discharge valve is connected to the discharge valve actuator;

a spring in engagement with the trigger and an end of the discharge valve actuator opposite the manifold chevron seal; and wherein the trigger ramp engages the at least one post.

18. The actuator of claim 17, wherein the trigger further comprises:

a non-actuated position wherein the discharge valve seals against the manifold outlet; and an actuated position wherein the discharge valve is not sealed against the manifold outlet.

19. The actuator of claim 18, wherein the trigger ramp acts on the at least one cross post in the actuated position to unseat the discharge valve from the manifold outlet.

* * * * *